United States Patent
Matsumoto et al.

[11] 3,881,032
[45] Apr. 29, 1975

[54] METHOD OF PREPARING FROZEN MINCED FISH MEAT HAVING A STRATIFIED STRUCTURE

[75] Inventors: Kazuo Matsumoto; Yoku Fukusaka, both of Tokyo, Japan

[73] Assignee: Teigin Limited, Osaka, Japan

[22] Filed: Apr. 2, 1973

[21] Appl. No.: 347,074

[30] Foreign Application Priority Data
July 12, 1972 Japan.............................. 47-69036

[52] U.S. Cl. ................ 426/643; 426/376; 426/524; 426/327; 426/518
[51] Int. Cl.............................................. A23l 3/36
[58] Field of Search .......... 426/442, 524, 370, 376, 426/212, 70, 364; 260/112 R; 62/65

[56] References Cited
UNITED STATES PATENTS
| | | | |
|---|---|---|---|
| 1,367,024 | 2/1921 | Dahl | 62/65 |
| 3,359,122 | 12/1967 | Zebarth | 426/524 |
| 3,432,311 | 3/1969 | Gruner | 426/212 |
| 3,692,545 | 9/1972 | Moore | 426/212 |

*Primary Examiner*—Norman Yudkoff
*Assistant Examiner*—Curtis Ribando
*Attorney, Agent, or Firm*—Sherman & Shalloway

[57] ABSTRACT

A method of preparing a frozen minced fish meat having a stratified structure, said method comprising submitting a minced fish meat containing on a dry weight basis 5 – 10-fold amount of water and on a dry weight basis 0.1 – 0.2-fold amount of sodium chloride, to a first freezing step consisting of passing the minced fish meat through the zone of maximum ice crystal formation at a slow freezing speed such that at least 3 hours are required therefor and thereafter submitting the minced fish meat to a second freezing step at a temperature ranging between −25° and −35°C. to complete the freeze.

3 Claims, 1 Drawing Figure

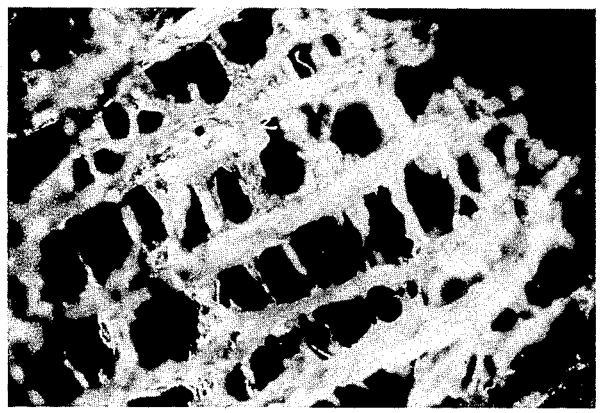

METHOD OF PREPARING FROZEN MINCED FISH MEAT HAVING A STRATIFIED STRUCTURE

This invention relates to a method of preparing frozen minced fish meat having a stratified structure. The terminology "frozen minced fish meat having a stratified structure," as used herein, is meant to be a frozen structure consisting of a plurality of superposed layers of porous minced fish meat the layers of which are weakly joined together by way of fish fibers.

The fish protein concentrates hitherto produced in the United States of America, Canada, Sweden, etc., (hereinafter to be referred to as D-type FPC) do not possess hydrophilic and water retention characteristics. Again, the dried boiled fish-paste prepared by drying the commercially available boiled fish-paste cannot be satisfactorily reconstituted. The reason for this is that in both of these products a cross-linking reaction has been set up as a result of the heat-denaturation of the protein, with the consequence that the protein has conglutinated and solidified. For imparting hydrophilic and water retention properties to these products and for improving their texture, the minute structures of these products as seen not only by the naked eye but also under a microscope must be made porous as well as having a stratified structure.

It is therefore an object of the present invention to prepare commercially efficiently a frozen minced fish meat having a porous and stratified structure without using any special food additives.

Another object of the invention is to provide a fish protein concentrate having hydrophilic and water retention properties (hereinafter to be referred to as H-type FPC), dried minced fish products having reconstitutability, or snack items, relishes and hors d'oeuvres, using the above minced fish meat as the starting material.

It has been found that the foregoing objects can be achieved by a suitable combination of the water and salt contents of the minced fish meat to be submitted to the freezing step and the speed at which the minced fish meat is to be frozen. That is, the frozen minced fish meat having the stratified structure satisfying the foregoing objects of the invention can be prepared by submitting a minced fish meat containing 5 - 10-fold amount (dry weight basis) of water and 0.1 - 0.2-fold amount (dry weight basis) of sodium chloride, to a first freezing step consisting of passing the minced fish meat through the zone of maximum ice crystal formation at a slow freezing speed such that at least 3 hours are required therefor and thereafter submitting the minced fish meat to a second freezing step at a temperature ranging between −25° and −35°C. to complete the freeze.

The term "zone of maximum ice crystal formation" is well known in the art of food freezing and is meant to be a temperature zone ranging from the freezing point (usually −1°C. in the case of fish) to −5°C. When food is frozen, a major portion of the water contained in the food is frozen during the time the temperature of the water declines from the freezing point to −5°C. to result in the formation of ice crystals. Since a tremendous amount of latent heat is released at this time, the temperature of the food itself shows practically no decline at this temperature zone. Hence, for accomplishing the usual objectives of food freezing, the experience is that the food must be passed through this temperature zone at the fastest possible freezing rate. One feature of the present invention resides in the point that contrary to such an experience the freezing is carried out at a slow rate. Unless this slow freezing is employed, the formation of the stratified structure as intended by the present invention cannot be achieved.

Another feature of the invention resides in the fact that the water contained in the minced fish meat to be submitted to the freezing step is adjusted to 5 - 10-fold amount (dry weight basis). When the water content is less than 5-fold amount, the product obtained has an excessively hard texture. On the other hand, when the water content exceeds 10-fold amount, the texture of the product becomes too soft. It is most convenient to use the commercially available frozen minced fish meat in the method of the present invention. However, not only the fish and shellfish usually used for food purposes but also the Menhaden hake or the abundantly harvestable lower class fish such as Anchovy can be used.

The invention method consists of (1) the step of preparing the fish for freezing, (2) the first freezing step, and (3) the second freezing step. These steps will be more fully described below.

1. Step of preparing the fish for freezing.

After cutting off the head and removing the entrails from the fish followed by separating the flesh from the bones and grinding the flesh finely with a chopper, the minced fish meat is hydrated by dipping in water several times and thereafter pressed and dehydrated so that the water content is adjusted to about 75 - 80 percent, thus preparing the starting fish meat. Next, 5 - 10-fold amount of water and 0.1 - 0.2-fold amount of sodium chloride are added to this starting fish meat, after which it is triturated. The so obtained minced fish meat is then placed in a freezing container of suitable shape and size.

The purpose of adding the sodium chloride to the starting fish meat as indicated above is to elute the salt-soluble protein.

2. First freezing step.

The freezing container containing the minced fish is placed in a freezer maintained at a temperature of −10°to −20°C., and the freezing is carried out at a slow freezing speed such that at least 3 hours are required for passing through the zone of maximum ice crystal formation. In consequence of undergoing this freezing step, the frozen minced fish meat having a stratified structure consisting of a plurality of porous horizontally superposed layers is formed. While from the technical standpoint there is no upper limit as to the required time for passing through the zone of maximum ice crystal formation, preferred from the economical standpoint is a time not exceeding 10 hours.

3. Second freezing step.

The frozen minced fish meat having a stratified structure obtained as described in the first freezing step is then frozen at a still lower temperature and the freezing is completed at a temperature of −25° to −35°C. The purpose of this freezing step is to improve the preservability of the frozen minced fish meat having a stratified structure obtained in the first freezing step and to facilitate the shredding operation in the hereinafter to be described processing step. No essential change in the structure of the frozen minced fish occurs in this second freezing step.

BRIEF DESCRIPTION OF FIGURE

The figure is a photomicrograph of the invention product magnified 50 times as viewed from its side.

The invention frozen minced fish meat having a stratified structure obtained as a result of having been submitted to the foregoing steps is a structure consisting of a plurality of porous fish meat layers having an average thickness of about 50 – 100 microns, and especially about 70 – 80 microns, the several layers being weakly joined together by means of fish fibers with a gap averaging about 200 – 250 microns between the several layers. The accompanying photograph is a photomicrograph of the invention product magnified 50 times as viewed from its side. In this photograph the plurality of lines extending in the horizontal direction are the layers of the fish meat, while the plurality of lines extending in the vertical direction are the fish fibers that weakly join these layers together.

The frozen minced fish meat having a stratified structure of the present invention can be used as the starting material for preparing the H-type FPC, dried minced fish meat products, snack items, relishes, hors d'oeuvres, etc., or as starting material for the preparation of such processed marine products as mashed and seasoned fish, fish flour, instant food products and special kippered products.

For instance, the H-type FPC can be prepared in the following manner. The foregoing frozen minced fish meat of the invention is shredded and then modified by heat-treating with a protein denaturant such as alcohol, an aqueous sodium bicarbonate solution or an aqueous acid solution. This is followed by defatting the so denatured minced fish meat with a hydrophilic solvent such as alcohol, after which the solvent is removed and the minced fish meat is frozen or dried. By utilizing the fact that it is tasteless and odorless as well as excels in hydrophilic and water retention properties, the H-type FPC can be advantageously used as a substitutive extender for fresh meats to be used in processed meat products such as hamburger and sausages or as meat substitutes for use in health foods. Needless to say, it can be used as in the case of the conventional D-type FPC as starting material for making bread and cookies.

On the other hand, the dried minced meat products can be made in the following manner. For instance, the foregoing frozen minced fish meat of the invention is shredded first and then, after denaturation by treatment with alcohol or by exposure to high frequency, is dried to prepare a dried minced meat product, which can be utilized as such as a snack item, relish or hors d'oeuvre. When boiled for several minutes, a minced fish product having the texture and taste identical to those of the usual steamed fish cake and boiled fish-paste can be obtained.

For more fully illustrating the invention, the following non-limitative examples are given.

EXAMPLE 1

5.1 Kg of pollack was decapitated and removed of their entrails, after which the flesh was separated from the bones and finely ground with a chopper. After water-washing and hydrating the so obtained meat using a 10-fold amount of water, it was dehydrated by pressing to obtain 0.92 kg of the starting material meat whose water content was 81 percent.

30 Grams of sodium chloride and 0.92 kg of water were added to 0.92 kg of this starting material meat, and by triturating for 30 minutes the minced fish meat was prepared. This minced fish meat was placed in a 10-mm deep stainless steel vessel and frozen in a freezer of −15°C., the freezing being carried out such that the time required for passing through the zone of maximum ice crystal formation was 4 hours and 30 minutes (first freezing step). This was followed by freezing the frozen product for 2 hours in a freezer of 25° to 30°C. to complete the freezing (second freezing step). Thus was obtained about 1.8 kg of a frozen minced fish meat having a stratified structure. When the gaps between the layers of this stratified structure were determined by a microscopical observation, the gaps averaged 230 microns.

When this was used and an H-type FPC was prepared, it was possible to prepare an H-type FPC excelling greatly in hydrophilic and water retention properties. Again, when a dried minced fish meat product was prepared from this product and boiled in hot water for 5 minutes, it was possible to prepare a marine minced meat product of good taste and reconstitutability. Further, when this product was eaten as such as a snack item or delicacy, its flavor, texture and palatability were exceedingly good.

EXAMPLE 2

Thirty grams of sodium chloride and 1 kg of water were added to the commercially available frozen minced fish meat, and thereafter by operating as in Example 1 a frozen minced fish meat was prepared in an amount of 2 kg. The gaps between the layers of this product averaged 240 microns.

When an H-type FPC dried minced meat product was prepared from this product, the results obtained were similar to those obtained in the case of Example 1.

EXAMPLE 3

After decapitating and removing the entrails from fresh pollack followed by separating the flesh from the bones and grinding the flesh finely with a chopper, the meat was water-washed and hydrated in water using a 10-fold amount of water. This was followed by dehydrating the meat by pressing it. Thus was prepared the starting material meat. This starting material meat was then added with water in an amount such that its water content would become 10-fold on a dry weight basis and 0.1-fold amount on a dry weight basis of sodium chloride, following which the meat was triturated with a triturator for 30 minutes to obtain a viscous minced fish meat.

This was then placed in a 10-mm deep stainless steel vessel and frozen in a freezer of about −15.5°C., the freezing being carried out such that the time required for passing through the zone of maximum ice crystal formation was 6 hours (first freezing step). Next, this frozen product was frozen for 2 hours in a freezer of −30° to −35°C. to complete the freezing (second freezing step).

Three hundred grams of the so obtained frozen minced fish meat was then cut with a cutter into cubes about 10-mm size while in its frozen state. The cubes while still retaining this state were immediately placed in a vessel containing 1200 ml of isopropyl alcohol, where they were left to stand for about 30 minutes, with the consequence that the protein was denatured.

Next, this vessel was equipped with an agitator and a condenser, and the contents were defatted by heating under reflux for 4 hours at about 85°C. This was followed by removing the defatting solvent with a centrifuge, after which 1200 ml of fresh isopropyl alcohol was added to the vessel to again carry out the defatting operation by refluxing for a further 2 hours, the defatting solvent being again separated by centrifugation. For extracting and removing the remaining solvent from the so obtained defatted meat, the defatted meat was introduced immediately into boiling water and boiled for one hour followed by centrifugation. This operation was repeated three times. Thus was obtained 41 grams of a practically white, tasteless and odorless H-type FPC of 10-mm cube form.

This H-type FPC was frozen and after holding it in its frozen state for one day, it was thawed, ground into ground meat with a meat grinder, mixed at the rate of 1:1 (weight) with fresh ground pork and prepared into sausages and hamburgers. When the taste and texture of the so prepared sausages and hamburgers were compared with those made using only fresh pork, of the five epicurean testers four declared that there was practically no difference in taste and that the texture was even better than that made from fresh pork.

Further, when this H-type FPC, after drying in a 70°C. hot air dryer, was rehydrated one month later with hot water and prepared into sausages and hamburgers in the same manner as described above, there was no difference at all in the taste and texture as compared with those made from the H-type FPC preserved under freezing.

EXAMPLE 4

Fresh pollack was used and a frozen minced fish meat having a stratified structure was prepared as in Example 3. This frozen minced meat was cut into small pieces having length of about 5 cm, a width of about 5 cm and a thickness of 2 mm, immediately placed in an electronic oven and exposed to microwaves having a frequency of 2450 MHz to denature the protein thereof. The pieces of minced fish meat were then withdrawn from the oven and dried in a 70°C. hot air dryer. Thus was obtained a dried minced fish meat product.

This product was rehydrated one month later and either used as ingredients of clear soup, miso soup, wheat and buckwheat noodle dishes, or cooking with vegetables, or for the preparation of sausages and hamburgers. When these were sampled by five epicurean testers, all were in agreement that the taste and texture of the invention product were very good.

Further, when this dried minced fish meat product was served as a relish with sake and beer, the taste and texture proved to be exceedingly satisfactory.

CONTROL 1

The experiment was operated exactly as in Example 1, except that the minced fish meat used was one prepared such that the water content would be 4.5-fold amount of the fish meat (dry weight basis). Thus was prepared 0.95 kg of a frozen minced fish meat having a stratified structure. The gaps between the several layers of this product averaged 110 microns. This product was used, and an H-type FPC and a dried minced fish meat product were prepared. When the so prepared products were sampled by the five epicurean testers, all declared that the products were unsatisfactory, the texture being exceedingly hard.

CONTROL 2

2.1 Kg of a frozen minced fish meat having a stratified structure was prepared by operating exactly as in Example 1, except that the minced fish meat used was one prepared such that the water content would be 11-fold amount of the fish meat (dry weight basis). The gaps between the several layers of this product averaged 290 microns. When this product was used, and a H-type FPC and a dried minced fish meat product were prepared, the results were unsatisfactory, since the texture was exceedingly soft.

What is claimed is:

1. A method of preparing a frozen minced fish meat having a stratified structure, said method comprising submitting a minced fish meat containing on a dry weight basis 5 – 10-fold amount of water and on a dry weight basis 0.1 – 0.2-fold amount of sodium chloride, to a first freezing step consisting of passing the minced fish meat through the zone of maximum ice crystal formation at a slow freezing speed such that at least 3 hours are required therefor and thereafter submitting the minced fish meat to a second freezing step at a temperature of the minced fish meat ranging between −25° and −35°C. to complete the freeze.

2. A method of preparing a frozen minced fish meat having a superposed structure consisting of a plurality of porous fish meat layers wherein the several layers are disposed with an average gap of 200 – 250 microns between the layers and are weakly joined together by way of fish fibers, said method comprising freezing the minced fish meat for 3 to 10 hours to a temperature zone ranging from −1° to −5° C., said minced fish meat containing on a dry weight basis 5 – 10-fold amount of water and on a dry weight basis 0.1 – 0.2-fold amount of sodium chloride and thereafter completing the freeze at a temperature of the minced fish meat ranging from −25° to − 35°C.

3. The method of claim 2 wherein the thickness of the fish meat layers averages 50 – 100 microns.

* * * * *